United States Patent
Geye et al.

(10) Patent No.: US 7,461,376 B2
(45) Date of Patent: Dec. 2, 2008

(54) DYNAMIC RESOURCE MANAGEMENT SYSTEM AND METHOD FOR MULTIPROCESSOR SYSTEMS

(75) Inventors: Scott Alan Geye, Rancho Santa Margarita, CA (US); Matthew Munson, Tustin, CA (US); Thomas Adrian Valverde, Ladera Ranch, CA (US); Steve JungHyun Hong, Cerritos, CA (US); James V Thomas Hendrix, San Clemente, CA (US)

(73) Assignee: Unisys Corporation, Blue Bell, PA (US)

( * ) Notice: Subject to any disclaimer, the term of this patent is extended or adjusted under 35 U.S.C. 154(b) by 995 days.

(21) Appl. No.: 10/715,791

(22) Filed: Nov. 18, 2003

(65) Prior Publication Data

US 2005/0108714 A1     May 19, 2005

(51) Int. Cl.
*G06F 9/46* (2006.01)
(52) U.S. Cl. ........................................ 718/100
(58) Field of Classification Search .................. 718/100
See application file for complete search history.

(56) References Cited

U.S. PATENT DOCUMENTS 5,600,822 A * 2/1997 Grice et al. ................... 712/16
6,782,410 B1 * 8/2004 Bhagat et al. ............... 709/201

* cited by examiner

*Primary Examiner*—Li B Zhen
*Assistant Examiner*—Mengyao Zhe
(74) *Attorney, Agent, or Firm*—James E. Goepel; Phuong Quan Hoang; Robert P. Marley

(57) ABSTRACT

A dynamic workload management system enables system administrators to easily identify installed applications and to assign them to affinity groupings in order of importance to the enterprise and to enable the system administrators to save and restore multiple configurations. The workload configuration is continually updated based on the hardware utilization measurements of the application groups that make up a workload configuration. The software interface of the system of the invention permits the system to dynamically add and remove processors to and from affinity masks that are automatically set up. This feature of the invention allows the application groups to consume CPU resources according to their priority.

23 Claims, 12 Drawing Sheets

|   | 0 | 1 | 2 | 3 |
|---|---|---|---|---|
| 0 | 1/2/3 | 1/2/3 | 2/3/1 | 2/3/1 |
| 1 | 1/2/3 | 1/2/3 | 2/3/1 | 2/3/1 |
| 2 | 3/1/2 | 3/1/2 | 1/2/3 | 2/3/1 |
| 3 | 3/1/2 | 3/1/2 | 3/2/1 | 1/3/2 |

Figure 6B

DYNAMIC RESOURCE MANAGEMENT SYSTEM AND METHOD FOR MULTIPROCESSOR SYSTEMS

FIELD OF THE INVENTION

The present invention relates to the field of multi-processor systems and, more specifically, to a system for dynamically managing resources in such multi-processor systems.

BACKGROUND OF THE INVENTION

Multiprocessor systems are well understood computing platforms wherein processes are run simultaneously or concurrently on two or more central processing units (CPU). The most widely used multiprocessor systems employ a shared memory and a shared bus. In such systems, each CPU has an assigned portion of memory and the operating system manages the logical separation of memory among the multiple CPUs. The operating system typically manages access to the shared memory and uses a process of caching to reduce memory contention.

Some multiprocessor systems assign an application to a single CPU. Other, more sophisticated systems, allow a single application to be assigned to more than one CPU. In that instance, a given process of an application could run on any one of the assigned CPUs. So for example, multiple processes affiliated with one application could simultaneously execute on two or more CPUs. For example, if a system had eight CPUs, a given application may be assigned to run on a subset of four particular ones of the eight processors, and not the other four CPUs. Presumably, the other four CPUs would be busy executing other applications.

The assignment of applications to CPUs is generally referred to as CPU affinity. Ideally, CPU affinity is selected in such a way to maximize system performance and to minimize movement of data from one CPU cache to another CPU cache. The set of CPUs that are assigned to execute an application are collectively referred to as an affinity mask. Additionally, more efficiency is gained by recognizing that what is generally thought of as an application is in practice a set of threads or sets of instructions that carry out a specific task. Oftentimes, threads can run independently of other threads. Hence, allowing multiple threads or processes from a single application to execute over a number of CPUs may dramatically increase application performance.

The ability to monitor the load balance across the multiple CPUs is critical to maximizing the overall system performance. For example, it would be undesirable to have one CPU or set of CPUs operating at near capacity while other CPUs sit idle. Similarly, it may be undesirable to have too many CPUs assigned to execute particular applications because too much overhead is generated by spreading the application over too many processes, particularly if the application is making insignificant utilization of one or more of the CPUs to which it is assigned. Therefore, there is a need to be able to gauge system performance at an application and CPU level in a multiprocessor system and to dynamically adjust CPU utilization. Existing systems require that a user (typically a system administrator) have an intricate understanding of the operation of the multiprocessor system in order to create affinity masks that are at all efficient, let alone optimal for a particular configuration.

SUMMARY OF THE INVENTION

The above-mentioned features are provided by a dynamic workload management system that enables users to easily identify and group installed applications and related processes, generate an affinity mask for each application group and assign a priority to the application group. Thereafter, the dynamic workload management system of the invention continually updates the affinity masks for each application group based on the hardware utilization measurements of the application groups. For example, the dynamic workload management system may automatically add or delete hardware resources (e.g., CPUs) to an application group if the hardware resource to which it has been affinitized is relatively over or underutilized.

The method and system of the invention permits the process to dynamically add and remove processors to and from affinity masks. This feature allows the affinity masks to consume CPU resources according to their needs, rather than through random assignment. This feature of the invention also automatically sets thresholds for adding, removing and sharing CPUs within a cluster for the application groups by adding processors from the same cluster if available. The process then manages these affinity masks automatically and makes sure that when the system's processors are utilization is balanced and efficient.

BRIEF DESCRIPTION OF THE DRAWINGS

A dynamic workload management system in accordance with the invention is further described below with reference to the accompanying drawings, in which:

FIG. 6B illustrates an example CPU assignment order for three application groups in a four cluster system in accordance with the flow chart of FIG. 6A;

DETAILED DESCRIPTION OF ILLUSTRATIVE EMBODIMENTS

A detailed description of illustrative embodiments of the present invention will now be described with reference to FIGS. 1-8. Although this description provides detailed examples of possible implementations of the present invention, it should be noted that these details are intended to be exemplary and in no way delimit the scope of the invention.

Figure 1:
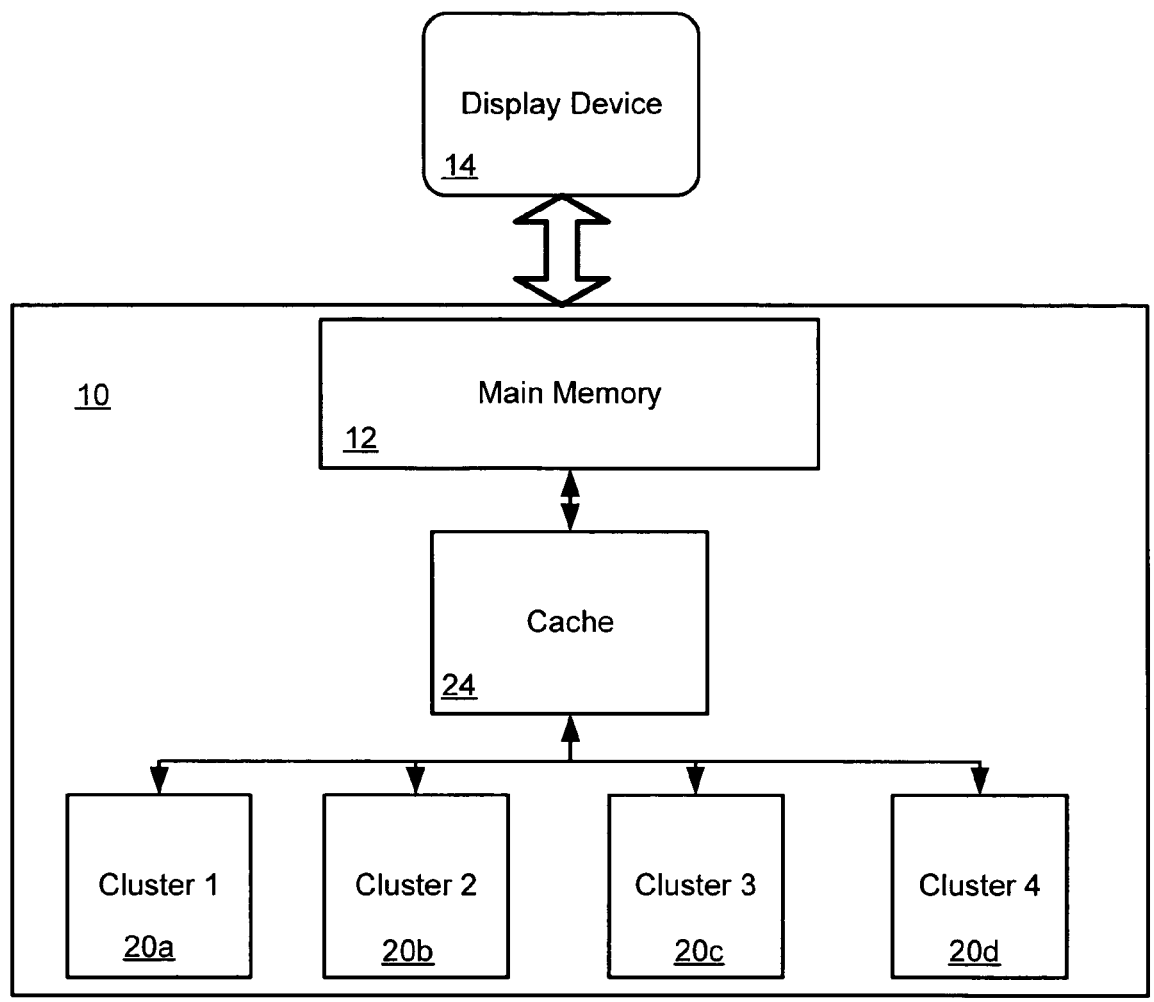
FIG. 1 illustrates an exemplary multiprocessor system wherein multiple processors are grouped in clusters.

FIG. 1 illustrates a multiprocessor system 10 wherein multiple processors are grouped in clusters (also referred to as sub-pods). The exemplary system has four clusters of microprocessors (e.g., 20a-20d) that share a common memory 12. The clusters may additionally share a high speed memory commonly referred to as a cache, e.g. cache 24. The system is connected to a display device 14, such as a computer monitor, LCD display, plasma display, etc., that can be used to display information about the multiprocessor system 10 according to aspects of the invention. Although the display device 14 is shown for illustrative purposes as connected directly to system 10, the display device may be connected in any number of well known ways, including by way of a network.

Figure 2:
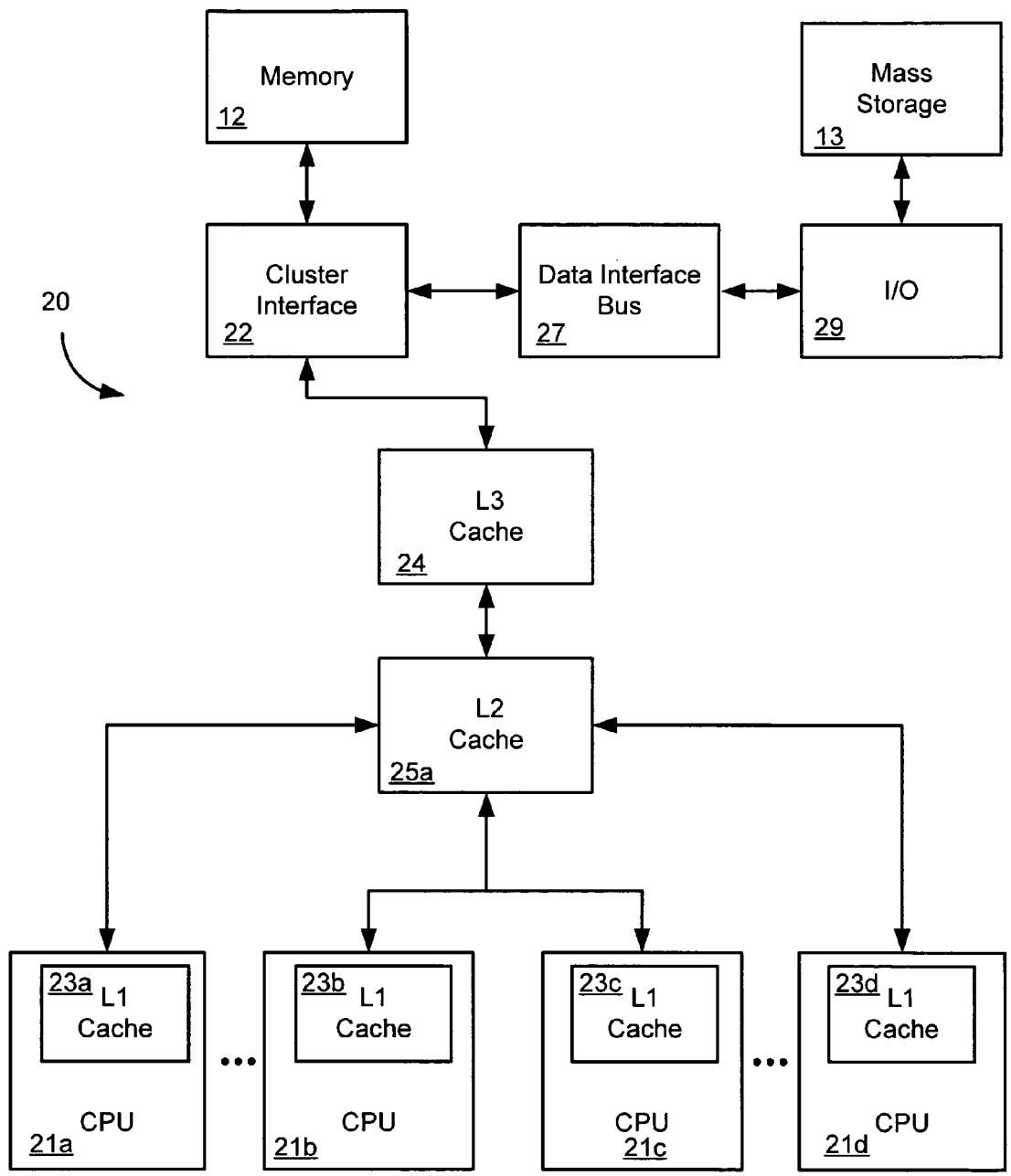
FIG. 2 illustrates further detail of the composition of an exemplary cluster of the multiprocessor system of FIG. 1.

FIG. 2 illustrates further detail of the multiprocessor system 10 regarding the composition of an exemplary cluster 20. Each cluster 20 has multiple CPUs. In this example, there are four CPUs, 21a-21d. Each CPU has an associated level 1 cache, e.g., CPU 21a has associated level 1 cache 23a that is generally on the CPU, CPU 21b has associated level 1 cache 23b, and so on. The level 1 cache is typically the highest speed memory available to a corresponding CPU.

Level 2 cache, unlike level 1, is shared among multiple CPU's (or processors) within a cluster. For example, CPUs 21a-21d share level 2 cache 25a (there would be a level 2 cache for each cluster 20b-20d (not shown)). All four processors in a cluster share a level 3 cache, e.g., cache 24 with other clusters, e.g., 20b, 20c and 20d (not shown).

In summary, level 1 cache is the faster memory available to a CPU and is not shared with any other CPUs in a system. Level 2 cache is typically very fast memory although not as fast as level 1. Level 2 cache has the additional distinction from level 1 cache in that it is shared with other CPUs. Here it is shared by all of the CPUs in a cluster. Hence data in level 2 cache is available to all of the CPUs to which are attached to it. Level three cache is shared at cluster level and is used as a mechanism to transfer data among clusters. Before data is consumed from level 3 cache it must be copied to level 2 and level 2 caches.

It is contemplated that the number of processors in a cluster and the number of clusters in a system may be any suitable number according to a particular implementation. The cache memories may be implemented by any suitable memory technologies, including static random access memory (SRAM) and dynamic random access memory (DRAM). Moreover, the cache implementation shown is an example only and a system may have fewer or more numerous levels of cache memory. The point of the illustration is that there are performance issues associated with a particular cache design. Whereas, CPU 21a can access data stored in cache 23a faster than it can access data in cache 25a, which is in turn faster than accessing data in cache 24. Hence, a context switch of a thread executing on CPU 21a to any one of CPUs 21b-21d would require movement of data from cache 23a to one of respective caches 23b-23d by way of cache 25. By contrast a context switch to a CPU executing on another cluster (e.g., 20b) would require data to be copied from cache 23a and perhaps cache 25a to cache 24 to level 2 cache on the respective cluster (e.g., 25b (not shown)) to level 1 cache on the respective CPU in the new cluster. As a result, context switching an application group (or a particular thread from an application group) from one cluster over to another cluster can cause significant performance degradation if such a switch is not performed in a timely way or is performed too frequently.

Main memory 12, level 3 cache 24 and mass storage 13 can all be accessed by all of the CPUs in the system (including CPUs in other clusters). The level 1 cache is the highest performance cache and the best performance of an application will result when the level 1 cache contains all of the data that is needed for a particular application thread. If the data needed for a thread is not found in level 1 cache, e.g., 23A, the system checks for the data in level 2 cache, e.g., 25a, then level 3 cache, e.g., 24 and finally main memory 12 (and then perhaps mass storage 13). Main memory 12 typically has the lowest performance of all of the memory systems with the exception of mass storage 13, which is much slower yet. Hence, moving or copying from main memory 12 provides the greatest performance degradation.

An application group as used herein is a set of applications, as well as a number of associated threads, programs, etc. that are used by a single "application." In other words, the application group may comprise more than the single application executable that a user typically considers to be the application. Rather, an application may also require affiliated processes that are needed to carry out the task of the primary application. Hence, an application group may comprise a single executable application or some set of executables that should be treated in a like manner for priority, CPU affinity, and so on.

System 10 is initially set up with application groups assigned to various CPUs in the system. The application group to CPU assignment is sometimes referred to as an affinity mask. That is, the mask determines which CPUs are eligible to execute an executable that is part of an application group. If the CPU is not part of the mask, then it is not an eligible CPU for execution, regardless of how busy or idle a particular CPU may be.

The initial application group assignments start out by assigning every application group to every CPU. In other words, all CPUs start out as eligible to execute an application group. However, the assignment of CPUs to application groups occurs in a particular order and the removal of CPUs from application groups occurs in the reverse order. In general, beginning with the highest priority affinity group, CPUs are allocated to the application group from within the same cluster to take advantage of the level 3 cache. Because the level 3 cache is connected to all of the CPUs in a cluster, when a thread runs in the same cluster there is an increased chance that the processor cache has the data needed by the thread. If a thread runs on a CPU in a different cluster from one time slice to the next, there is an increased chance that the data needed by the thread will not be in the cluster's level 3 cache. If this data is not found in the cluster's level 3 cache, the thread has to wait until the memory or the system finds the data, and then the data has to be transferred either from memory or from another cluster's level 3 cache to the memory, and then to the cluster's level 3 cache where that the thread is running. At that point, the thread can use that data.

When possible, keeping the threads in a single cluster will increase the chance that the data needed by a thread will be in that cluster's level 3 cache, thereby increasing performance by not having to go to memory 12 for the data. The result is managed system performance and ensures that application group's load is properly balanced across a multiprocessor system. Managing the system resources requires the need for understanding which application groups are on a system, which processors are available to execute the application groups, associating the application groups to a set of the available processors (an affinity mask) and periodically adjusting the affinity mask to maximize the system performance.

Adjusting the affinity mask requires and understanding of processor utilization. Raw processor utilization is typically measured by running an idle thread on a CPU when no other process is running and subtracting the percentage of time that the idle thread runs on the CPU from 100%. In a multiprocessor system, the value of CPU utilization may be expressed as an average across the processors of interest, e.g., all of the processors in the system, a cluster of processors, or the set of processors belonging to an affinity mask. Of particular interest here is determining processor utilization for a particular affinity mask.

When a system is set up initially, an initialization process sets up an affinity mask for the application groups and assigns an order in which processors will be added and removed from each group. A monitoring process then monitors the CPU utilization of the affinity groups and determines when to add or remove a CPU from an affinity group.

Figure 3:
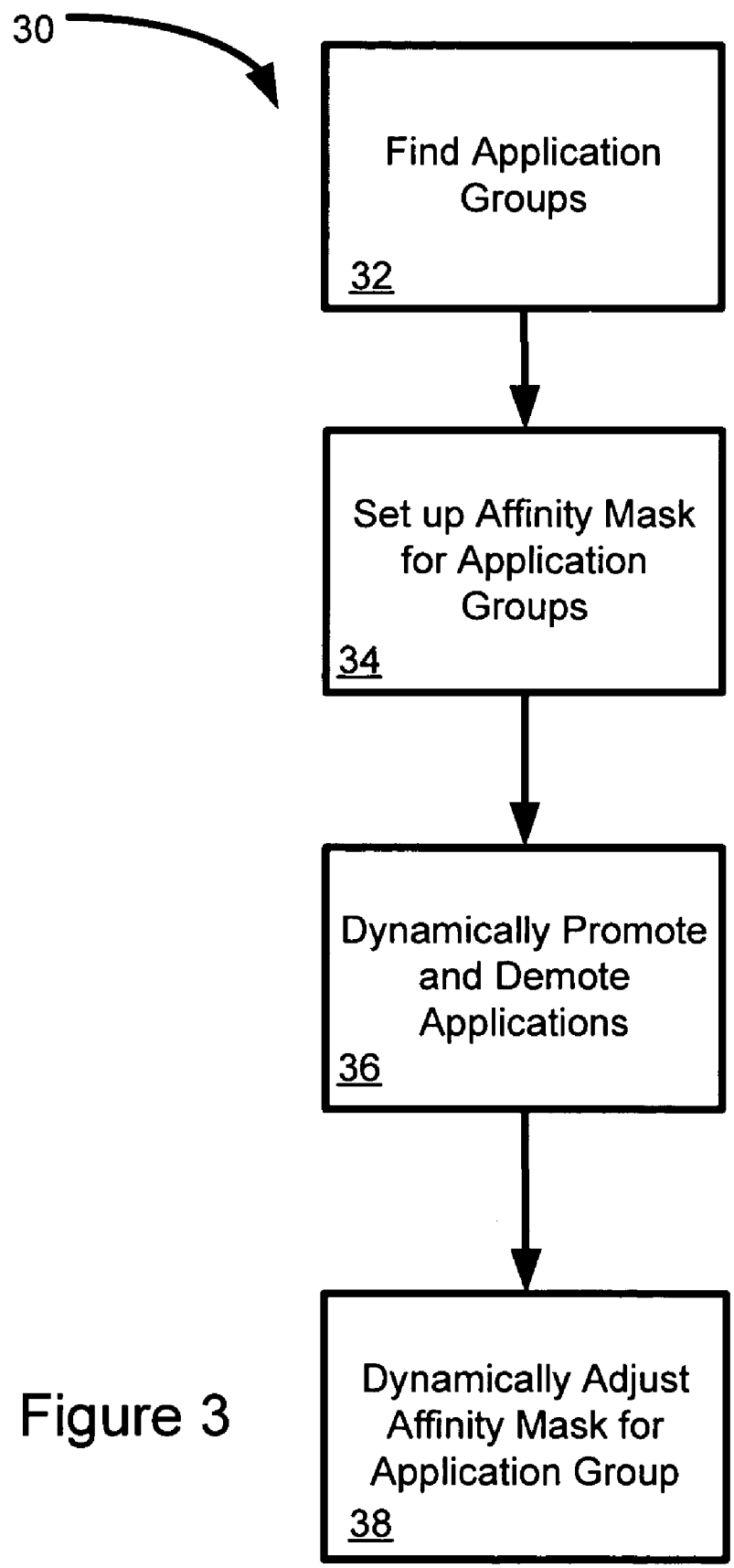
FIG. 3 illustrates a high level diagram of the primary steps in the method of the invention.

FIG. 3 provides a high level diagram illustrating the primary steps in the system. Initially, the application groups are set up (step 32). This can be done automatically, as described more fully below, or manually by allowing a user to associate various executables, processes, threads, programs, etc. in a common application group. Next each application group is assigned to processors to generate an affinity mask of all of the processors that the application group can execute on (step 34). Finally, the affinity mask is dynamically adjusted during system operation as a function of CPU utilization (step 36).

Elements of embodiments of the invention described below may be implemented by hardware, firmware, software or any combination thereof. The term hardware generally refers to an element having a physical structure such as electronic, electromagnetic, optical, electro-optical, mechanical, electromechanical parts, while the term software generally refers to a logical structure, a method, a procedure, a program, a routine, a process, an algorithm, a formula, a function, an expression, and the like. The term firmware generally refers to a logical structure, a method, a procedure, a program, a routine, a process, an algorithm, a formula, a function, an expression, and the like that is implemented or embodied in a hardware structure (e.g., flash memory, ROM, EROM). Examples of firmware may include microcode, writable control store, and micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, etc.

The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include programs, code, data, files, and the like.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, and the like. A software module is coupled to another module to receive variables, parameters, arguments, pointers, etc. and/or to generate or pass results, updated variables, pointers, and the like. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Embodiments of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed.

Figure 4:
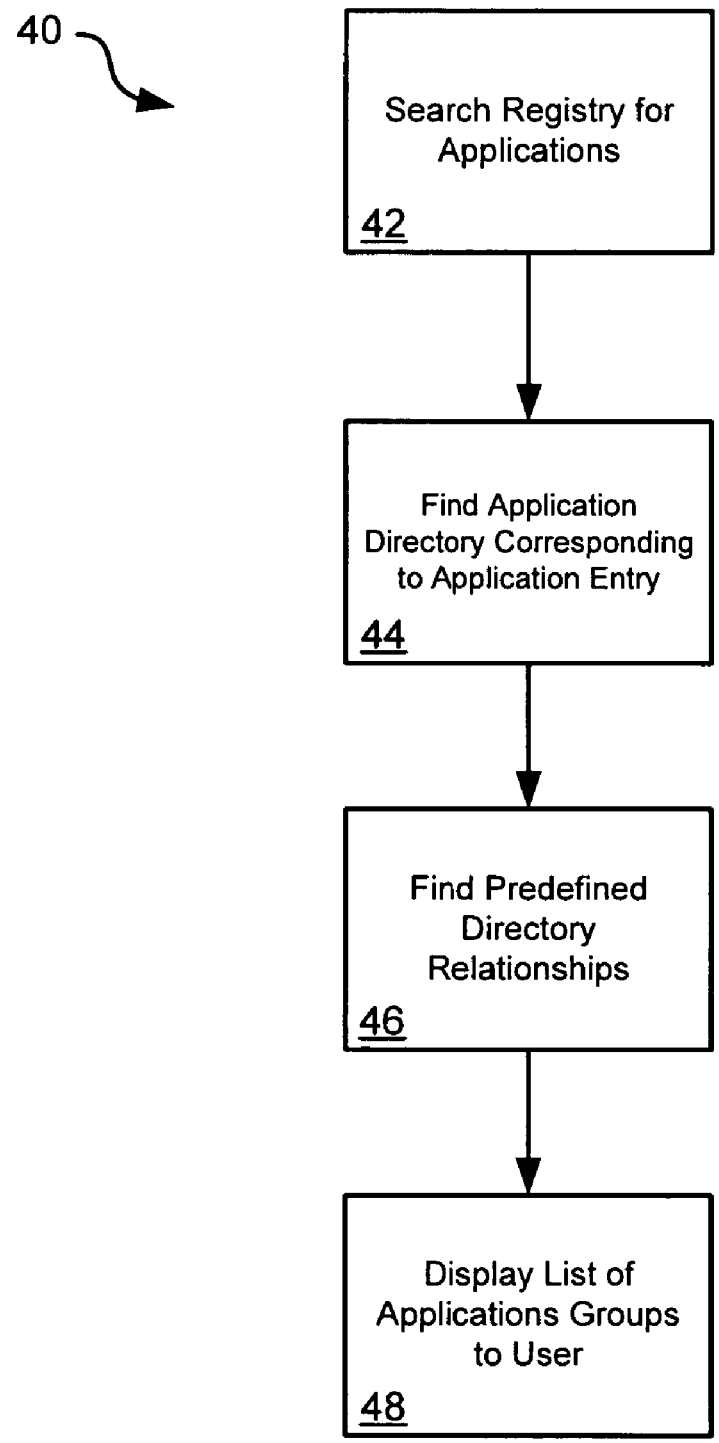
FIG. 4 illustrates the process of defining application groups in accordance with the invention.

FIG. 4 further illustrates the process 40 of defining application groups. Initially, in step 42 the application finder searches the registry keys for applications. The finder process generally searches for a prescribed set of installed applications whose performance can be enhanced by an affinity mask. That set of prescribed applications can be defined as hard-coded, command line arguments, stored tables, files, XML sets, a combination of the previous, etc. Thereafter in step 44, the application finder looks to find registry entries (e.g., add/remove panel in Windows) to find directories that contain fully qualified paths (or partial ones) that point to where the executables of prescribed applications of interest reside. Sometimes all the relevant executables are in the same directory so one path will do, while other times, the executables are scattered so multiple directories need to be accounted for. Hence in step 46, the application finder determines application/directory relationships. This information (of how many paths are needed) is known in advance by the application finder by for example, a look up table, coded into the application finder, provided by an XML file, and so on for the predefined applications supported by the application finder.

As the Application Finder searches for registry keys for the prescribed set of applications, it looks under the HKEY_LO- CAL_MACHINE key for various registry keys. A few common places it looks are: 1) in the Uninstall area: "SOFTWARE\Microsoft\Windows\CurrentVersion\Uninstall", 2) under the services: "SYSTEM\CurrentControlSet\Services", and 3) the Add/Remove Programs area: "SOFTWARE\Microsoft\Windows\CurrentVersion\App Management\ARPCache". Once the programs are found, the application finder looks for the key that contains the fully qualified path (or at least hints to it). A few keys to note are InstallLocation, ImagePath, and Services. These are example keys that can contain the information the application finder seeking. Other keys and could be used to locate paths. For example, additional directory paths can be provided to the application finder in the form of a table, XML file, etc. In the case of commonly used applications, the locations of the folders and executables will be well known. Such predefined applications that may be searched for by the application finder may include, by way of example: SAP, SQL 2000, IIS 5.0, Oracle, IIS 6.0, and Microsoft Exchange.

With the information from the keys (and other information), along with some pre-programmed setting information (e.g., whether or not to use dynamic affinitization, place a limit on committed memory, etc), the applications are displayed in step 48 to the system administrator so that the system administrator may then select the applications to be prioritized and managed by the dynamic workload management system of the invention.

Figure 5A:
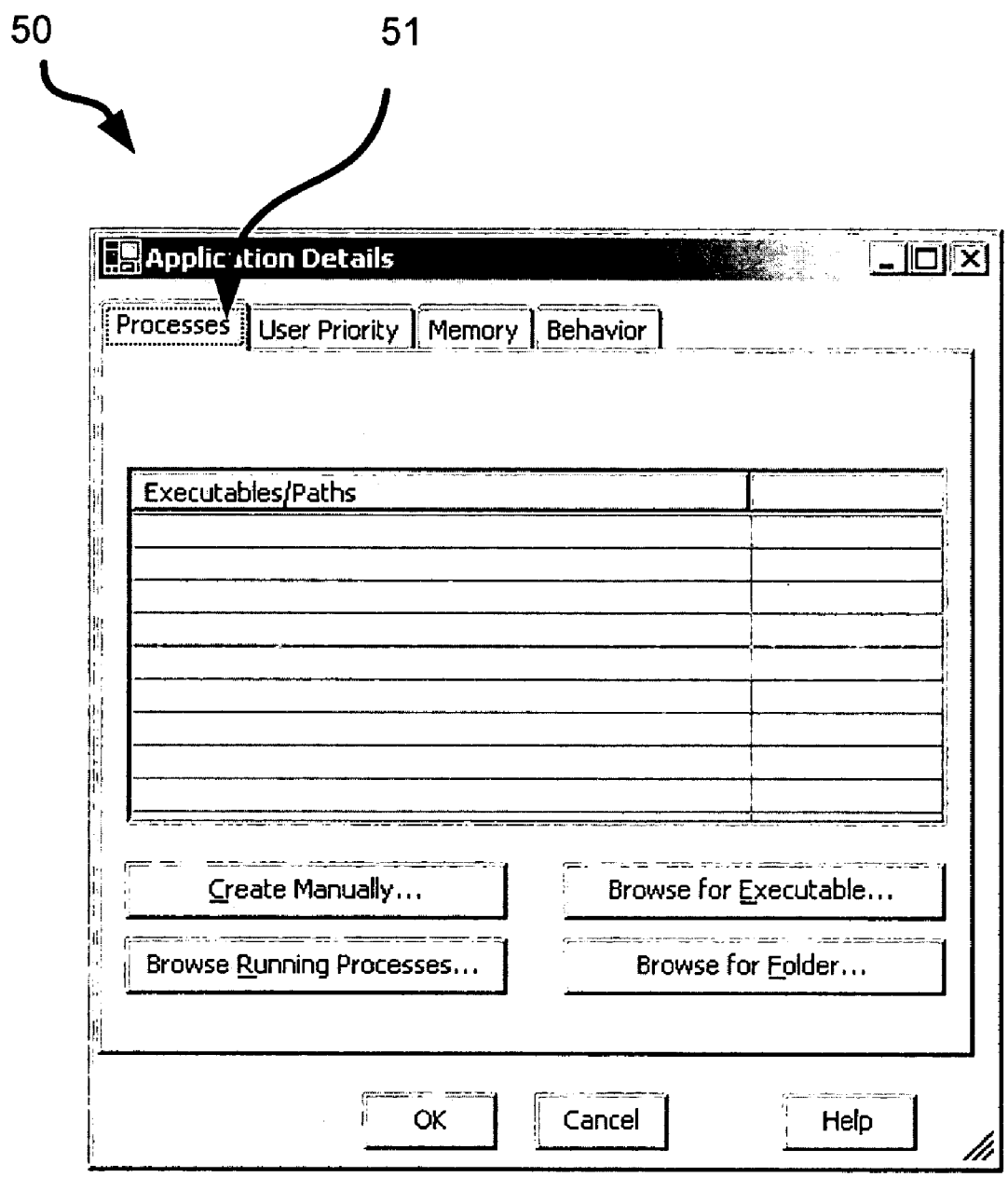
FIG. 5A illustrates how the system of the invention may provide a window wherein a user can define application groups manually, set the application group priority, and define memory usage characteristics.

FIG. 5A illustrates how the system may provide a window 50 wherein a user can define application groups manually, set the application group priority, and define memory usage characteristics. By selecting the processes tab 51, a user can select executable paths to associate with an application group. Here, under the first tab 51 of the window, a user can browse for executables manually and group a set of executables together into a single application group.

Figure 5B:
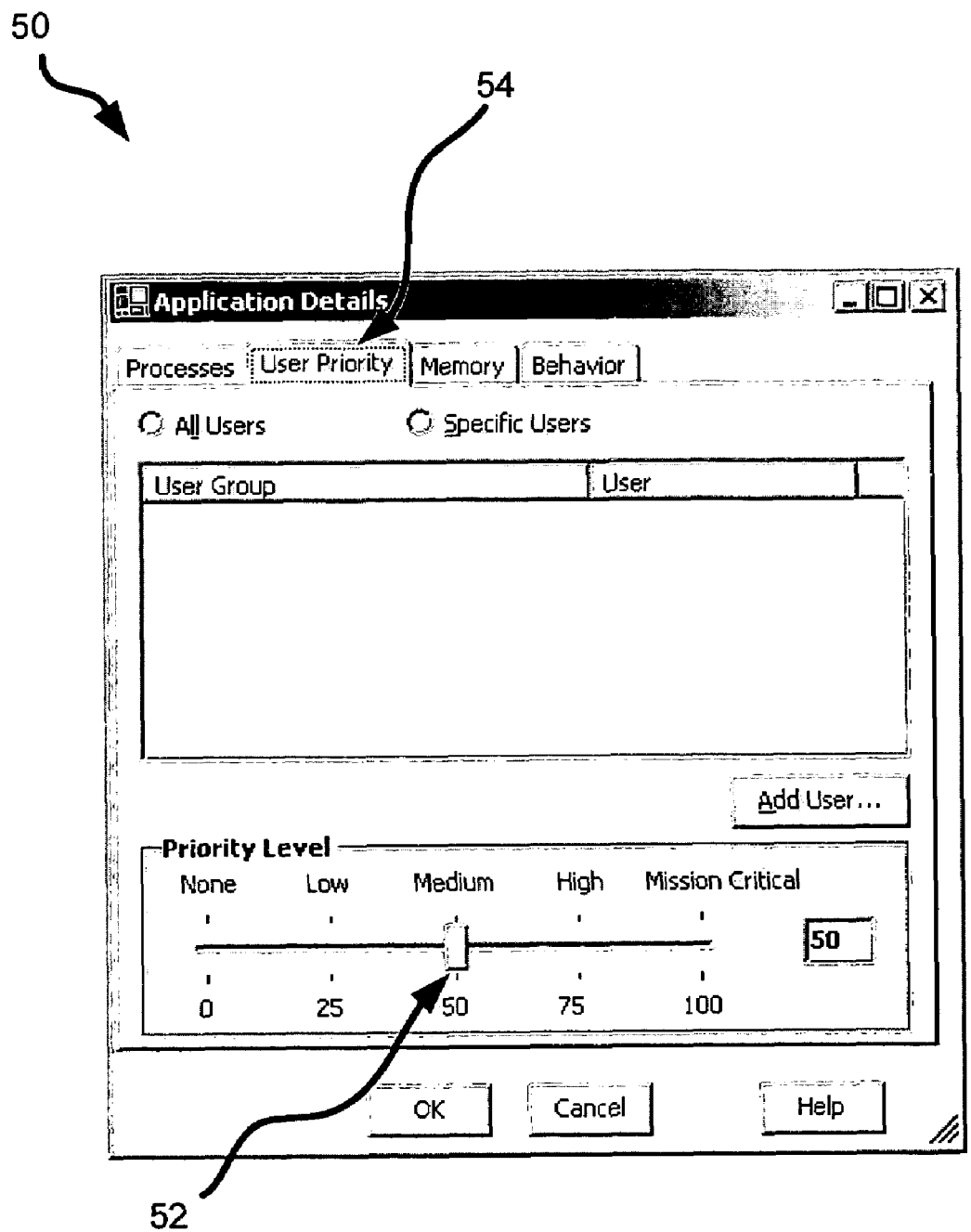
FIG. 5B illustrates how, after all of the program groups are defined (or after each program group is defined), the priority is set for that program group for a particular user.

As illustrated in FIG. 5B, after all of the application groups are defined (or after each application group is defined), the priority is set for that application group for a particular user. As an example, a window 50 provides a user (e.g., a system administrator) a tab 54 wherein the user priority for an application group is set. Here, a sliding scale 52 provides a graphical input mechanism for setting the application priority. So, for example, in this window a user could assign a first application group, Application 1, a priority of 50, a second application group, Application 2, a priority of 30, a third application group, Application 3, a priority of 20, and so on.

Figure 5C:
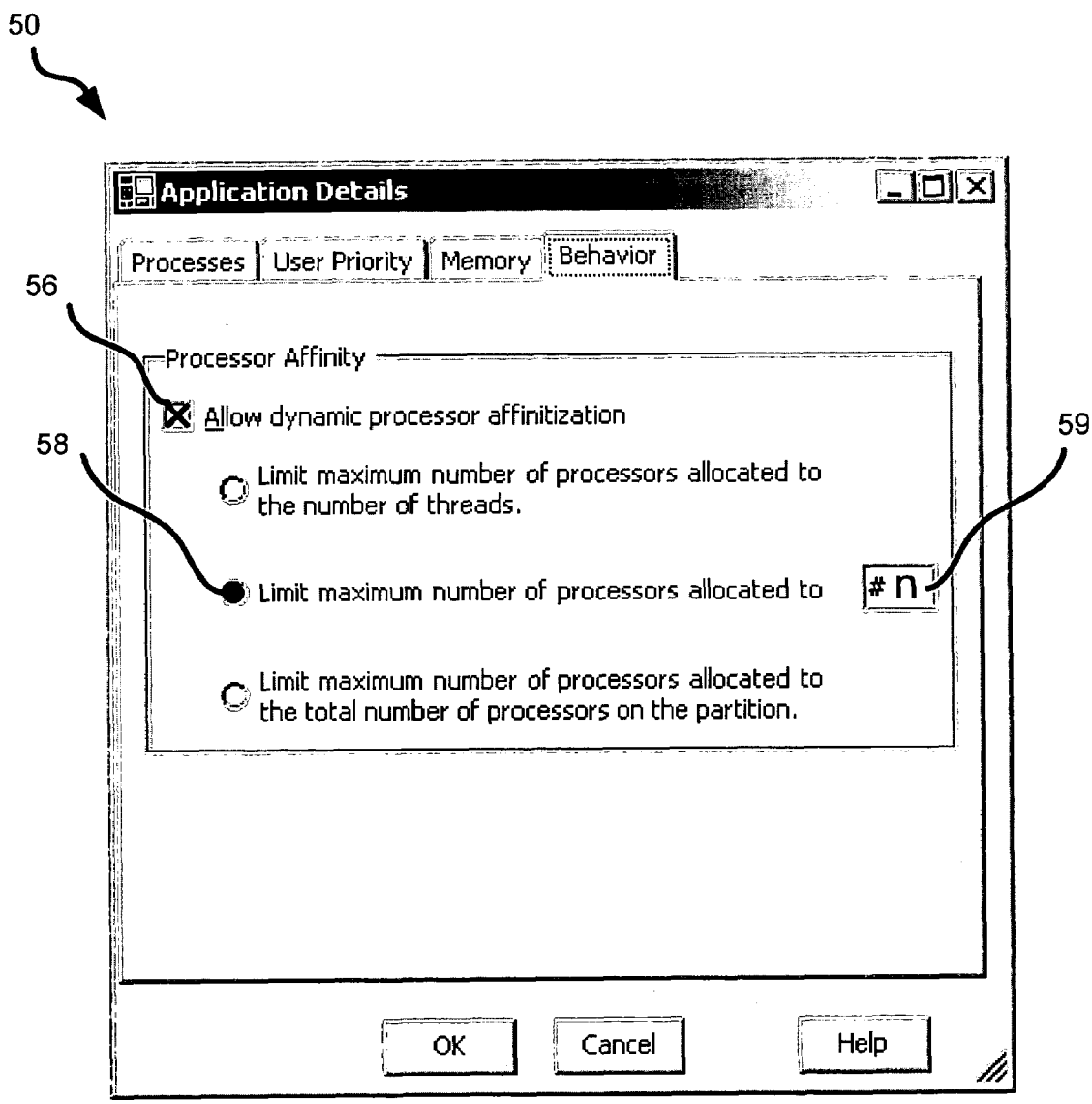
FIG. 5C illustrates how the system of the invention allows a user to set up additional application group parameters.

FIG. 5C illustrates how the system allows a user to set up additional application group parameters. For example, check box 56 allows the user to set dynamic processor affinitization, as explained more fully below. Additionally, the user can select a radio button 58 to enter a limit in box 59 on the number of processors assigned to a particular application group. By setting a limit on the number of processors that can be assigned to an application group, an affinity mask for that application group will never contain more than the set number of processors, although it may contain less.

After an application group is defined, the application group affinitization is set up. Beginning with the highest priority program group, an affinity mask is generated for each application group. The aim of the affinitization process is to keep a program group on CPUs within the same cluster 20 to take advantage of the shared level 2 cache 25 contained in each cluster 20. For example, in the embodiment of FIG. 2, each cluster 20 has four CPUs 21a-21d and one level 2 cache 25 connected to the four CPUs 21a-21d. It would be undesirable to have an application group spread over multiple CPUs in different clusters.

Figure 6A:
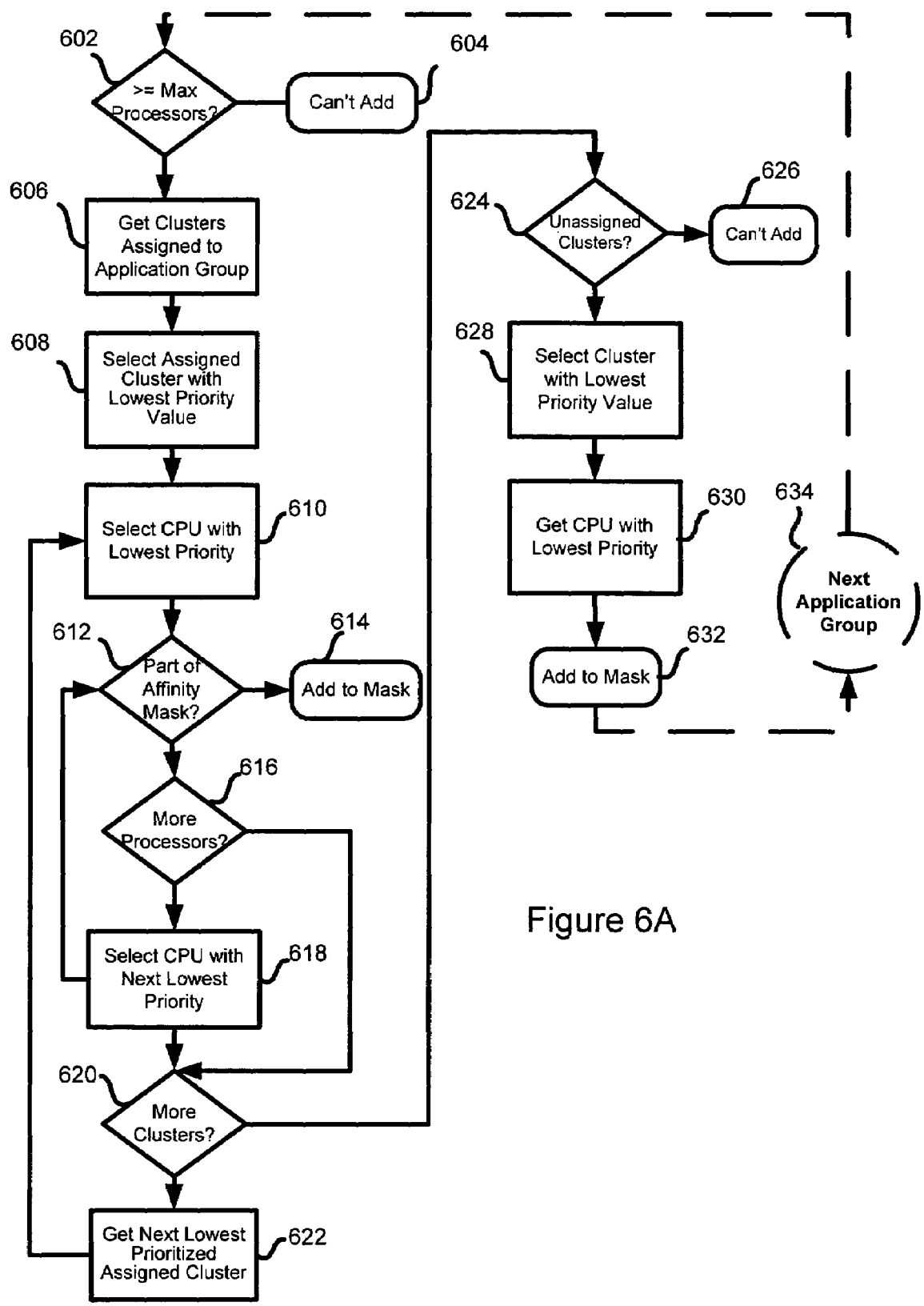
FIG. 6A illustrates a flow chart for adding processors to an application group's affinity mask.

If the application group is set up for dynamic affinity, processors are added to an affinity mask according to the flow chart of FIG. 6A. As described below, processors are removed from an affinity mask in the reverse order that they were added. In other words, the last CPU that was added to an affinity mask is the first CPU deleted from an affinity mask. The first time that an affinity mask is created, the flow chart of FIG. 6A is called until all application groups have been added to all CPUs (or until the maximum number of CPUs allowed have been added to an affinity mask).

Before the process of FIG. 6A is performed, a mapping object representing the physical processor topology of the system is set up. This mapping object holds a reference to each processor and the total priority values of all the processes running on each processor and cluster on the system. The mapping object is a multi-dimensional sorted array with each dimension representing a processor set level on the system (i.e., sub-pods to processors). In each dimension, the first element is the lowest prioritized processor set (processor set with the smallest total priority values of the processes running on them). Initially, of course, all of the priority values are set to zero and no CPUs have application assignments.

Elements of embodiments of the invention described below may be implemented by hardware, firmware, software or any combination thereof. The term hardware generally refers to an element having a physical structure such as electronic, electromagnetic, optical, electro-optical, mechanical, electromechanical parts, while the term software generally refers to a logical structure, a method, a procedure, a program, a routine, a process, an algorithm, a formula, a function, an expression, and the like. The term firmware generally refers to a logical structure, a method, a procedure, a program, a routine, a process, an algorithm, a formula, a function, an expression, and the like that is implemented or embodied in a hardware structure (e.g., flash memory, ROM, EROM). Examples of firmware may include microcode, writable control store, and micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium. The "processor readable or accessible medium" or "machine readable or accessible medium" may include any medium that can store, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include programs, code, data, files, and the like.

Following the logic though the flow chart and using the example application groups above, an affinity mask assignment proceeds as follows. First, Application 1 (having the highest priority), begins searching for a CPU addition. Since all CPUs are unassigned, Application 1 passes step 602 because it could not have the maximum number of processors assigned. At step 606, the process looks for all clusters that contain a CPU that has been assigned to Application 1. The first time through there are no CPUs assigned, so the process essentially passes all the way though the flow chart until step 624 (all of the steps are not shown in the flow chart for brevity and clarity), and finds the first cluster and the first CPU in the cluster, e.g., 20*a* (in practice, the first CPU in the first set of the multidimensional array is returned because at this initial stage all of the CPUs are essentially equal). Next the process searches for a CPU to assign to Application 2. To that end, the process essentially passes through the same steps as Application 1, except that at step 628, the cluster assigned to Application 1 will have a priority value of 50, the remaining clusters will have a priority value of 0. Hence, Application 2 is affinitized to one of the CPUs in one of the remaining empty clusters, e.g., 20*b*. Similarly, the search for a CPU for Application 3 follows the same process. Now, however, clusters with Application 1 and Application 2 will have the priority values of 50 and 20. As a result, Application 3 will be assigned to one of the remaining unassigned clusters, e.g., 20*c*.

After all of the application groups have been assigned to a CPU within a cluster (e.g., Application 1 to cluster 20*a*, CPU 21*a*, Application 2 to cluster 20*b*, CPU 21*a* of cluster 20*b*, Application 3 to cluster 20*c*, CPU 21*a* of cluster 20*c*), the process again searches for a CPU for Application 1. This time, however, at step 606, the cluster previously assigned to Application 1, e.g., 20*a*, is found. At step 608, cluster 20*a* is the only cluster with CPUs assigned to Application 1. At step 610, the CPU in the selected cluster with the lowest priority is found. This can be any one of the three remaining CPUs in the cluster, e.g., 21*b*-21*d* because 21*a* is the only assigned CPU and the only CPU with a priority value, e.g. 50.

At steps 612 and 614, the selected CPU is determined not to be part of the affinity mask and is returned and added to the mask. The process of FIG. 6A continues in this fashion until all of the CPUs have been assigned to all of the application groups. At that time, step 624 will determine that there are no remaining clusters that are unassigned and no additional CPUs can be added to the affinity mask (step 626).

Figure 6B:
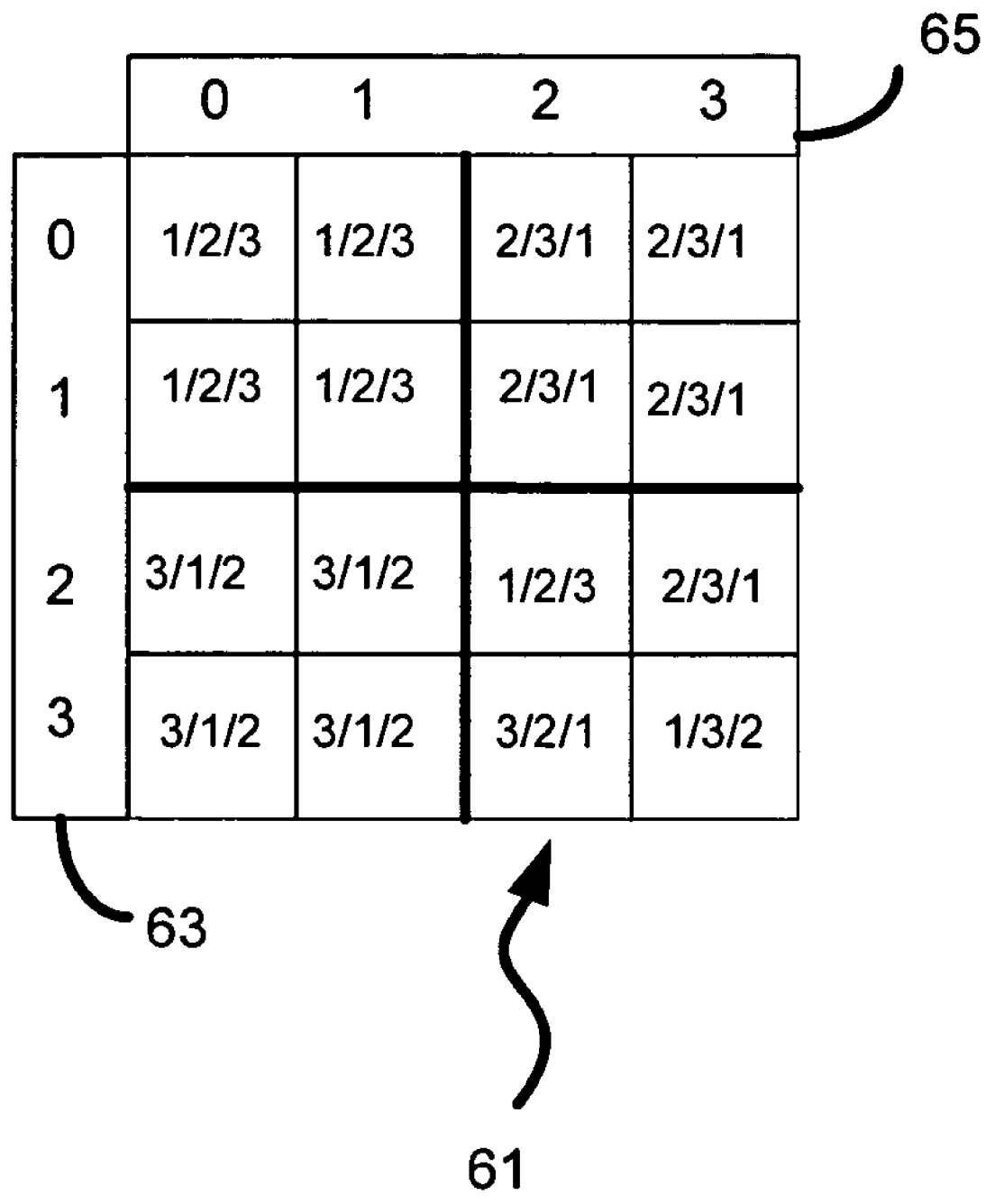

Notice that after all of the CPUs in all of the three initial clusters are assigned, the remaining cluster gets a mixed processor assignment. FIG. 6B illustrates the CPU assignments in a four cluster system that would result from applying the process of FIG. 6A to the intial assignments. Two-dimensional array, 61, has rows 63 and columns 65. Notably. Columns 0, 1 and rows 0, 1 have the application group assignments 1, 2, 3 in that order, corresponding to the assignments of the CPUs in the first cluster. Similarly, columns 2, 3 and rows 0, 1 have the application group assignments 2, 3, 1 in that order, corresponding to the second cluster assignments. And, columns 0, 1 and rows 2, 3 have the application group assignments 3, 1, 2 in that order, corresponding to the third cluster assignment. Lastly, columns 2, 3 and rows 2, 3 have mixed application group assignments corresponding to the final cluster.

In general, the algorithm illustrated in FIG. 6A can be summarized as follows:

1. If the application group has reached the maximum number of the processors it can add to its affinity, then exit with no processor being found.

2. Generate a list of shared second level processor sets that the application group is running on.

3. Search for the best-shared second level processor set by looping through each shared processor set. In the shared processor set loop, get the lowest prioritized processor set that has not been searched and loop through each processor in that set until each processor has been checked. In the processor loop in each shared processor set loop, get the lowest priority valued processor that has not been checked and if this processor has not been added to the application group's affinity mask, exit and return this processor as the next processor to add. Repeat for each processor in each shared processor set.

4. Search for the best non-shared second level processor set by looping through each non-shared processor set. In this search loop, get the lowest prioritized processor set and exit and return this processor as the next processor to add.

Figure 6C:
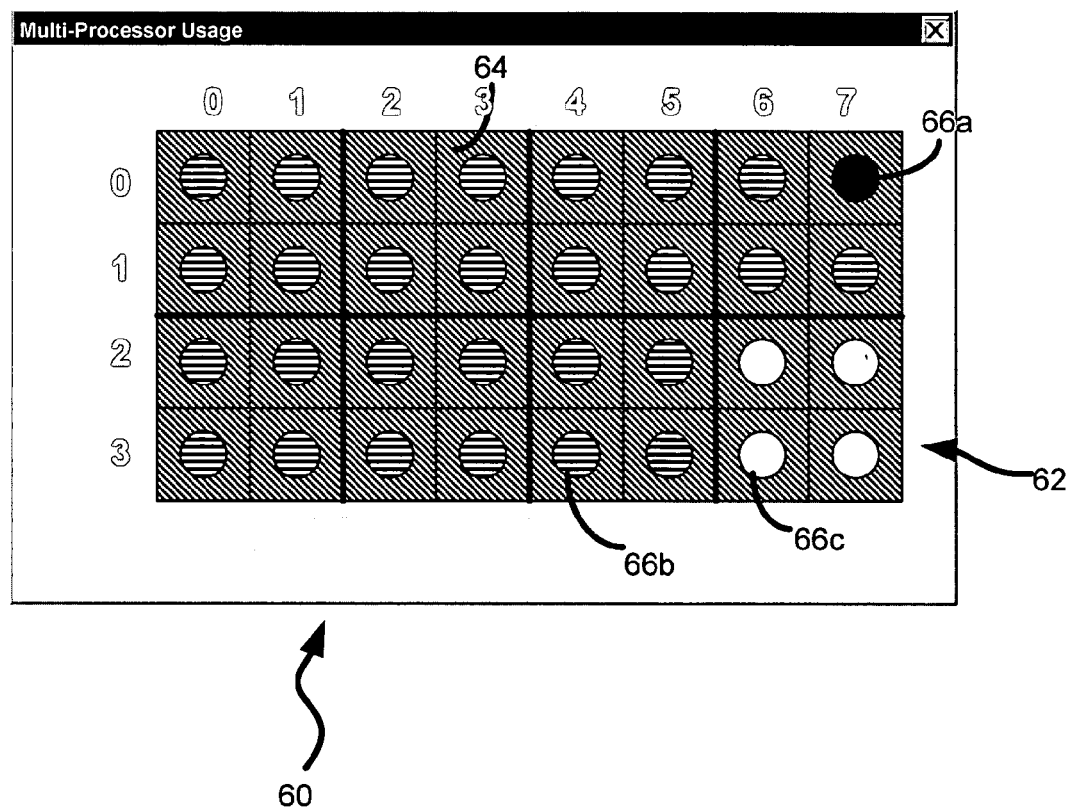
FIG. 6C provides an illustrative graphic depiction of an affinity mask for an application group running on an eight cluster, thirty-two CPU system at a given instant of time.

FIG. 6C provides an illustrative graphic depiction of an affinity mask for an application group running on an eight cluster, thirty-two CPU system at a given instant of time. This affinity mask 60 provides information about each cluster, and application groups that are executing on a particular cluster. One such affinity mask display is preferably provided for each application group so that a user can easily view what CPUs have been assigned to an application group and which CPUs are available to have an application group assigned to them. Each cluster of four CPUs, e.g. 62, is demarcated by the heavy lines. Within each cluster, a graphic 66*a*, 66*b*, 66*c*, etc is provided that represents a CPU physically joined in a cluster. Each CPU graphic, e.g., 66*a*, 66*b*, 66*c* can further provide an indication of its status. For example, a color, shading, or pattern provides an indication of whether a CPU can be assigned to an application group or not, or whether the CPU is part of the system. In the example of FIG. 6C, a white circle, e.g., 66*c*, indicates that the CPU is not part of the system (e.g., those four CPUs are unavailable for any number of reasons such as they are not part of the affinity system, hardware failure, maintenance, and so on), a black circle indicates that the CPU, e.g., 66*a*, is available to be assigned to the application group, and a lined circle indicates that the CPU, e.g., 66*b*, has already been assigned to the application group. The background color, e.g., 64, can have a color, shading, or pattern that corresponds to the application group.

Figure 7:
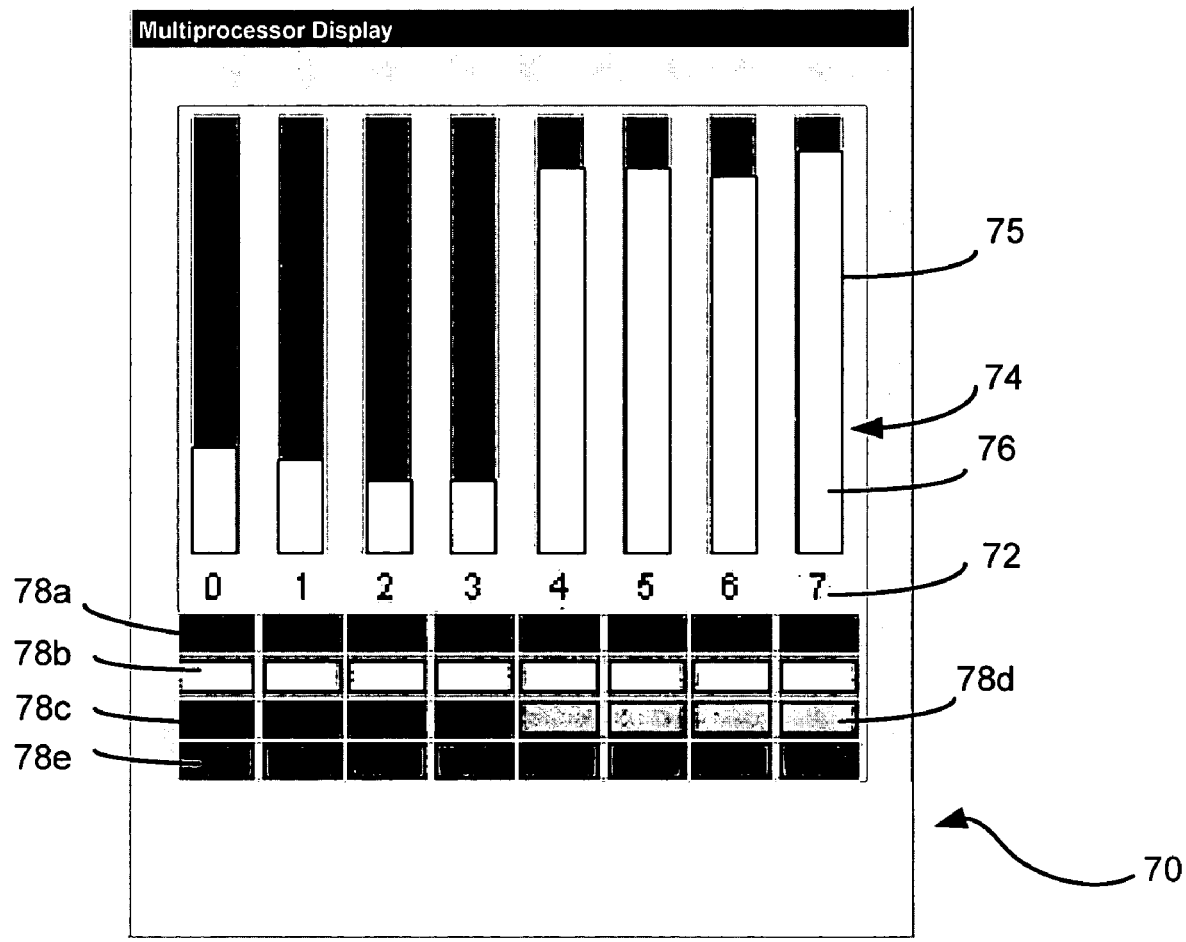
FIG. 7 illustrates how various affinity masks impact CPU utilization on a per processor basis in accordance with the invention.

As described briefly above, the system dynamically adjust the affinity masks in order to optimize application group efficiency and CPU utilization across the system. If an application group is executing on too many CPUs, it may cause too much overhead (e.g., by crowding out other application that could make better use of a particular CPU) and degrade the system performance. On the other hand, if there are too few CPUs assigned to the application group, those CPUs may be over taxed and the application may not run as fast or as efficiently as it could if additional CPUs were added. FIG. 7 further illustrates how various affinity masks interact on a per processor basis. In this display, multiple vertical bars, e.g., 74, show the utilization of a particular CPU in the form of a percentage (0-100) of the full bar. This bar will be referred to herein as a processor bar. A colored region 76 (shown in white) within the bar will rise and fall according to the utilization of the processor. At 100% utilization, the colored region will be at full height. At 50% utilization, the colored region will be half of its full height. At 0% utilization, the colored region will have no height and not be visible. Below each processor bar, the name of the processor is displayed, e.g., 0, 1, 2, etc.

In the display, a series of blocks, e.g. 78a-78e, appears beneath a processor bar. There is one block for each application group that uses a particular processor. Thus, by viewing a processor bar and its application blocks, an indication of the how the particular application groups are utilizing a CPU is demonstrated. Here for example, the processors 0 through 3 appear to have relatively light CPU utilization; whereas processors 4-7 have a relatively heavy CPU utilization. The difference between the two set of processor is that application group 78c has been assigned to processors 0-3 and application group 78d has been assigned to processors 4-7. If this load balance were to persist over time, the dynamic affinitization of the present invention may make an adjustment by adding processors to some application groups and removing processor from some others.

A monitoring process determines when an application groups' CPU usage indicates that CPUs should be added or removed from application groups. In addition, and accordance with another aspect of the invention, the monitoring process determines when or whether to promote or demote an application's priority class. Priority class is the class that is provided for by the underlying operating system. For example, the WINDOWs OPERATING SYSTEM provides for at least two priority classes, NORMAL and ABOVE-NORMAL. An application whose priority class is ABOVE NORMAL will have priority over an application whose priority class is NORMAL.

The monitoring process also calculates CPU utilization for each application group. CPU utilization is determined by getting the processor usage statistics for a given process. That number represents the usage of a process across an entire system (e.g., it is not limited to its affinity mask). In order to normalize the value, it is multiplied by the number of processors in the system and divided by the number of CPUs in the affinity mask. The application usage is used to determine whether to add or delete CPUs from the affinity mask of a particular application group. Each of these items have thresholds associated with them. As long as no threshold is hit, the system will not add or remove any CPUs. There will be an upper limit and a lower limit set for each group.

Once the applications are scheduled and prioritized, the dynamic workload management system of the invention attempts to predict processor usage by checking each application to determine if it is to be promoted or demoted based on the priority schedule. For example, applications at NORMAL may be promoted periodically to ABOVE NORMAL priority to assure the application gets an opportunity to run during a particular time window where it is efficient for the application to run. This process is illustrated with respect to FIG. 8.

Figure 8:
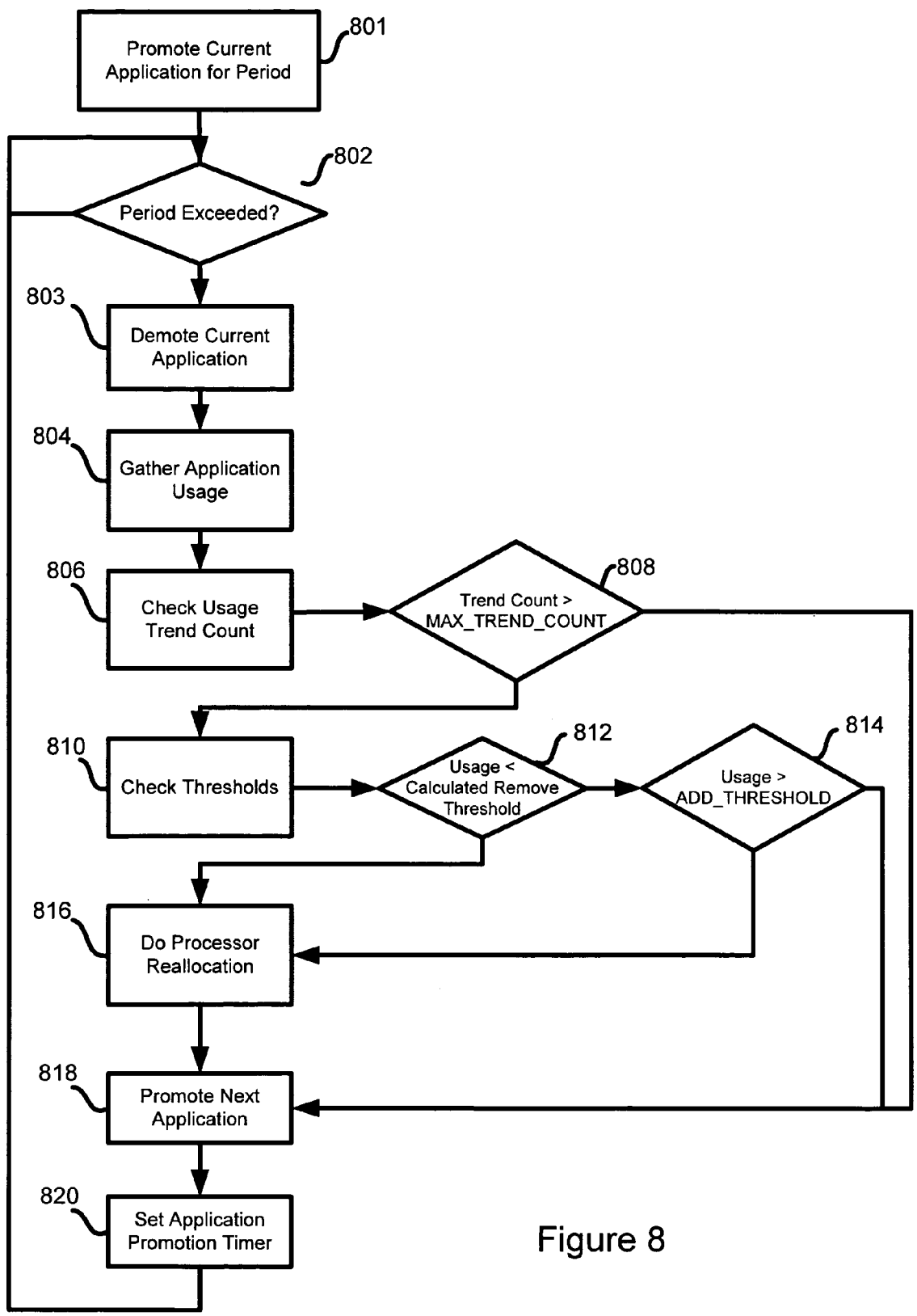
FIG. 8 illustrates the process whereby the dynamic workload management system of the invention promotes and demotes applications and dynamically adjusts affinity masks.

As shown in FIG. 8, applications are managed in accordance with the invention by initially promoting the application group with the highest priority (step 801). When the application group promotion period expires (step 802), the application group is demoted at step 803. In other words, those applications that were promoted for a period of time for higher priority processing are demoted when the set promotion time expired (e.g., the priority is changed from Above Normal to Normal). Since the current application was allowed to run at full potential during its promotion time, a sample is taken at step 804 of the applications group's usage (i.e., the processor utilizations for an application group on the system times the processor count in the system divided by the processors to which the application group is affinitized). At step 806, the system checks how many times application utilization samples have been gathered as a trend count.

If it is determined at step 808 that enough samples have been gathered (MAX_TREND_COUNT), the system takes the average application utilization and checks the utilization against predefined utilization thresholds at step 810. If it is determined at step 812 that the average usage is greater than the predefined ADD_THRESHOLD, then resources are to be added and processing proceeds to step 816 for a processor reallocation. For example, the add threshold may be set at 85% utilization so that if a processor is operating at over 85% utilization, another processor is added. On the other hand, if it is determined at step 814 that the average usage is less than the calculated remove threshold (REMOVE_THRESHOLD), then resources are to be removed and processing proceeds to step 816 for processor reallocation. For example, the remove threshold could be set at 65% whereby the last processor added is removed and its processes reallocated to other processors. Preferably, a band is used to prevent "thrashing" in which processors are continually removed and added as the thresholds are repeatedly surpassed. Processing then proceeds to the next application in the list and the application is promoted at step 818 (i.e., the priority class is changed from Normal to Above Normal). Based on the priority of the application (set according to FIG. 5B) the promotion time is determined as priority divided by one hundred times the maximum promotion time (priority/100*MAXIMUM_PROMOTION_TIME). Thereafter, a timer is set at step 820 to go off after the promotion time has ended to start the loop over again at step 802. Processing proceeds on an application by application basis.

This promotion/demotion technique may also be used to provide an indication of how much processor usage a particular affinity group could use. Since a particular affinity group may have lower priority than other groups on a processor, that affinity group will not be able to take all the processor time it needs. Accordingly, if the affinity group's average processor usage is then taken during the time in which that affinity group has a higher priority, the average processor usage number will better reflect how much processor usage the affinity group actually needs.

Notably, the Processor Reallocation process of step 816 is preferably adds CPUs to affinity masks according to the process outlined above with respect to the flow chart of FIG. 6A and preferably removes CPUs from affinity masks by remove them in the reverse or in which they were added. It should also be pointed out that initially the Processor Reallocation will be removing CPUs from affinity masks. That is, initially all application groups are generally assigned to all available CPUs. As the system starts to perform however, the usage statistics will indicate a very low usage for an application group because the usage will be averaged over the entire set of CPUs (see step 804 and accompanying description). Hence, CPUs will continue to be gradually removed from affinity masks until the system comes into balance. Thereafter, as applications continue to be used the affinity mask will gradually become optimized as CPUs are deleted and added across multiple application group affinity masks.

In accordance with the invention, the resource thresholds may be customizable so that a system administrator may decide at what level resources are to be added or taken away from an application. The system administrator also may be allowed to change the sample intervals to control how often the dynamic workload management system checks resource usage and makes allocation changes.

The dynamic workload management system of the invention also may be cluster-aware whereby system performance is monitored and workload is moved among clusters based on priority and availability. In particular, the dynamic workload management system of the invention permits every node of a cluster and multiple partitions to be configured for workload management from a single user interface. The system may also be enhanced to permit the movement of applications based on I/O and memory requirements as well.

A configuration includes a group of applications and their respective properties. The dynamic workload management system of the invention uses these configurations to properly manage the workload of an individual partition and propagate any configurations to other nodes of a cluster. Through remoting, system administrators may use the dynamic workload management software of the invention to configure any partition from any other partition or client workstation. Individual configuration files for each partition are saved locally through an agent on the partition, thereby enabling the system administrator to configure all nodes of a cluster to have the same workload management properties through a single node.

As the workload management algorithm described above starts reassigning processors based on usage, it is possible for other applications to be assigned to one or more of the same processors and to take up a large portion of the CPU time. Since the first two assignment options limit the number of processor an application can have assigned to it, it becomes advantageous to move an application to another set of CPUs where it is more likely to get a chance to run. This yields better performance for applications with lower priorities that may not get as much time to run.

A system administrator might want to have his or her applications managed differently based on the current month, day, or hour. For example, a system administrator may want accounting software to have the highest priority on his or her system during the last day of the month or quarter but give the enterprise web server priority at all other times. The dynamic workload management software of the invention allows the system administrator to base configurations on a schedule so as to alleviate the problems involved in managing multiple configurations. The system administrator is no longer required to load configuration files when he or she wants them to run. The system administrator simply sets a schedule of what days and times a certain configuration will be active and leaves the dynamic workload management software to perform its function.

In this fashion, the dynamic workload management system of the invention permits the system administrator to change the priority of applications over time. In other words, applications and system configuration may be completely swapped based on the time of day, week, or month. The dynamic workload management system of the invention permits the system administrator to perform this function by setting a configuration timetable much as one sets up a calendar in Microsoft's Outlook program. In other words, the user interface allows the system administrator to set up when different configurations will be run automatically in a manner that mimics the scheduling functionality provided in Microsoft Outlook. The user interface preferably shows a calendar that displays intervals when different configurations will be active, allows intervals to be set up in cycles (e.g., every Friday or the last day of the month.), and checks for conflicts in the scheduling of configurations.

Those skilled in the art will appreciate that the dynamic workload management system of the invention permits system administrators to fine tune and to automate many systems so that they work together to prioritize and optimize the workload on and between each computer. In particular, the workload is managed in such a way that the systems work together to ensure that the critical processes optimally complete their tasks. If needed, the system management will automatically move all processes off of one system and send the processes to other systems in the cluster, reboot itself, and then take back the processes without manual intervention.

Those skilled in the art also will readily appreciate that many additional modifications are possible in the exemplary embodiment without materially departing from the novel teachings and advantages of the invention. Any such modifications are intended to be included within the scope of this invention as defined by the following exemplary claims.

What is claimed:

1. A method of dynamically managing a computer system having a plurality of processors, comprising:
   identifying a first set of computer-readable instructions;
   identifying a second set of computer-readable instructions wherein said first set of computer-readable instructions and said second set of computer-readable instructions comprise an application group;
   assigning the application group to at least one of said plurality of processors using an affinity mask; and
   automatically adjusting the number of processors assigned to said application group by adding to the affinity mask based on processor usage in the system, and removing the processor from the affinity mask based on processor usage in the system and in a reverse order that the processor is added to the affinity mask, the adjustments being made after at least the first set of computer readable instructions are elevated in priority class.

2. The method of claim 1 wherein the first set of computer-readable instructions comprise a computing thread.

3. The method of claim 1 wherein the first set of computer-readable instructions comprise an application program.

4. The method of claim 1 wherein the processor usage is based on the CPU utilization for the computer-readable instructions.

5. The method of claim 4 wherein the CPU utilization is normalized for the CPUs in the number of processors eligible to execute the first set of instructions.

6. The method of claim 1 wherein the processor usage comprises an average processor usage taken over a predefined interval.

7. The method of claim 1 where the act of automatically adjusting the number of processors compares the processor usage to a threshold value.

8. The method of claim 7 wherein the threshold value for adding a processor is above about 85% of CPU utilization on the processors that the first set of instructions is executing on.

9. The method of claim 7 wherein the threshold value is for deleting a processor is below about 65% of CPU utilization on the processors that the first set of instructions is executing on.

10. A system for dynamically managing a computer system having a plurality of processors, comprising:
    at least one processor;
    a computer memory device in communication with said at least one processor bearing computer computer-executable instructions capable of identifying a first set of computer-readable instructions;
    a computer memory device in communication with said at least one processor bearing computer computer-executable instructions capable of identifying a second set of computer-readable instructions wherein said first set of computer-readable instructions and said second set of computer-readable instructions comprise an application group;
    a computer memory device in communication with said at least one processor bearing computer-executable instructions capable of assigning the application group to at least one of said plurality of processors using an affinity mask; and a computer memory device in communication with said at least one processor bearing computer-executable instructions capable of automatically adjusting the number of processors assigned to said application group by adding to the affinity mask based on processor usage in the system, and removing the processor from the affinity mask based on processor usage in the system and in a reverse order that the processor is added to the affinity mask, the adjustments being made after at least the first set of computer readable instructions are elevated in priority class.

11. The system of claim 10 wherein the first set of computer-readable instructions comprise a computing thread.

12. The system of claim 10 wherein the first set of computer-readable instructions comprise an application program.

13. The system of claim 10 wherein the processor usage is based on the CPU utilization for the computer-readable instructions.

14. The system of claim 13 wherein the CPU utilization is normalized for the CPUs in the number of processors eligible to execute the first set of instructions.

15. The system of claim 10 wherein the processor usage comprises an average processor usage taken over a predefined interval.

16. The system of claim 10 where the computer memory device bearing computer-executable instructions capable of automatically adjusting the number of processors is capable comparing the processor usage to a threshold value.

17. An article of manufacture comprising:
a processor readable medium bearing computer-readable instructions of dynamically managing a computer system having a plurality of processors, comprising:
instructions for identifying a first set of computer-readable instructions;
instructions for identifying a second set of computer-readable instructions wherein said first set of computer-readable instructions and said second set of computer-readable instructions comprise an application group;
instructions for assigning the application group to at least one of said plurality of processors using an affinity mask; and
instructions for automatically adjusting the number of processors assigned to said application group by adding to the affinity mask based on processor usage in the system, and removing the processor from the affinity mask based on processor usage in the system and in a reverse order that the processor is added to the affinity mask, the adjustments being made after at least the first set of computer readable instructions are elevated in priority class.

18. The article of manufacture of claim 17 wherein the first set of computer-readable instructions comprise a computing thread.

19. The article of manufacture of claim 17 wherein the first set of computer-readable instructions comprise an application program.

20. The article of manufacture of claim 17 wherein the processor usage is based on the CPU utilization for the computer-readable instructions.

21. The article of manufacture of claim 20 wherein the CPU utilization is normalized for the CPUs in the number of processors eligible to execute the first set of instructions.

22. The article of manufacture of claim 17 wherein the processor usage comprises an average processor usage taken over a predefined interval.

23. The article of manufacture of claim 17 where the instructions for automatically adjusting the number of processors compares the processor usage to a threshold value.

* * * * *